Jan. 23, 1945.  A. R. GRAD  2,368,017
CONTROL FOR HYDRAULIC TRANSMISSIONS
Filed April 14, 1941  3 Sheets-Sheet 1

INVENTOR.
ADOLF R. GRAD
BY
ATTORNEY.

Jan. 23, 1945. A. R. GRAD 2,368,017
CONTROL FOR HYDRAULIC TRANSMISSIONS
Filed April 14, 1941 3 Sheets-Sheet 2
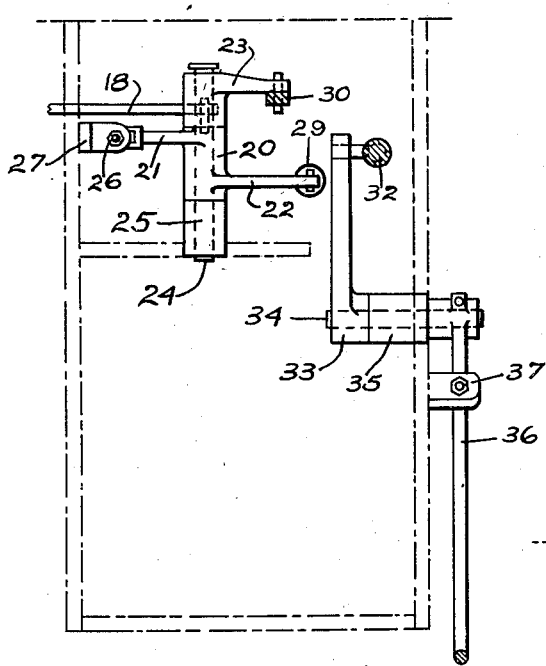
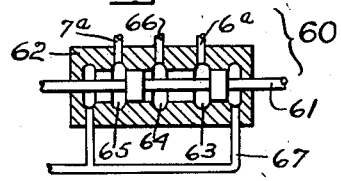
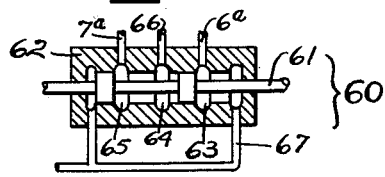
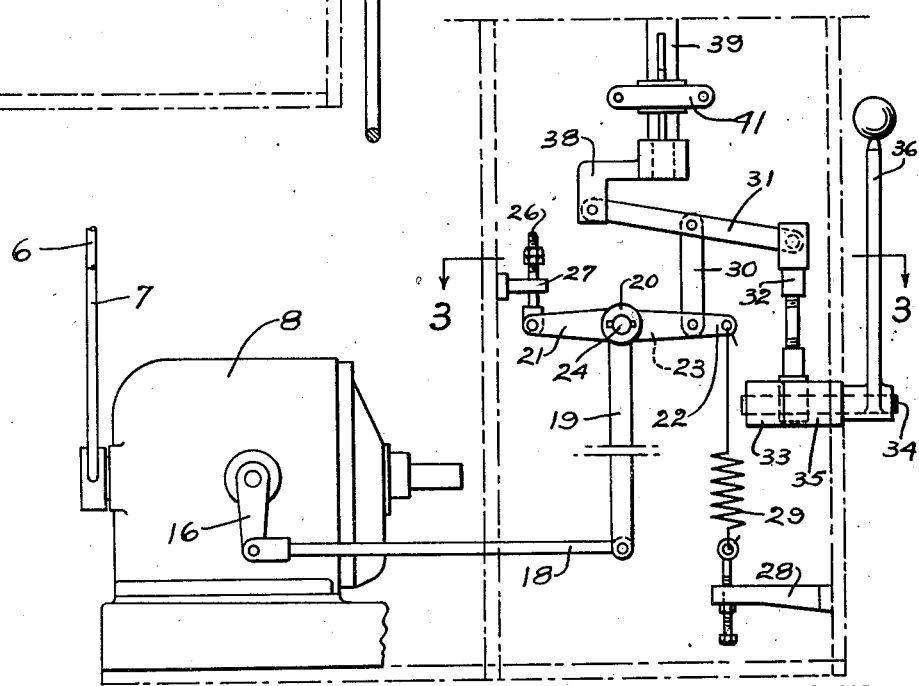
INVENTOR.
ADOLF R. GRAD
BY
ATTORNEY.

Jan. 23, 1945.   A. R. GRAD   2,368,017
CONTROL FOR HYDRAULIC TRANSMISSIONS
Filed April 14, 1941   3 Sheets-Sheet 3

INVENTOR.
ADOLF R. GRAD
BY
ATTORNEY.

Patented Jan. 23, 1945

2,368,017

UNITED STATES PATENT OFFICE 2,368,017

CONTROL FOR HYDRAULIC TRANSMISSIONS

Adolf R. Grad, Wauwatosa, Wis., assignor to The Oilgear Company, Milwaukee, Wis., a corporation of Wisconsin Application April 14, 1941, Serial No. 388,375

9 Claims. (Cl. 60—52)

This invention relates to a control for hydraulic motors of the type employed for moving an element through selected distances or to selected points such as the motors of hydraulic presses which are employed to bend articles into desired shapes or to straighten bent or distorted articles.

Such a press is ordinarily of the downward acting type and has two stationary abutments arranged below and upon opposite sides of a tool carried by the ram of the press. An article to be straightened is placed upon the abutments with its bent or distorted portion extending upward and arranged between the abutments, the motor is energized and moves the tool downward into engagement with the article, and downward movement of the tool is continued until the bent portion has been deflected in the opposite direction far enough to straighten it.

In order to properly straighten an article or to bend an article into a desired shape, accurate and absolute control of the motor is necessary and various mechanisms have heretofore been devised for the purpose of obtaining such control but all have had objectionable characteristics. For example, one of those control mechanisms provides a valve for controlling the flow of motive liquid to and from the motor, a manually operable control element for opening the valve and means responsive to movement of the motor piston for closing the valve so that the movement of the motor piston is proportional to the movement of the control element. This control mechanism enables the operator to accurately control the motor but it causes a large waste of power with resultant heating of the motive liquid and it is necessary to move the control element continuously and through a wide range during the entire time that the motor is advancing the tool from its stationary position into engagement with the work.

This invention has as an object to provide a straightening or bending press with a control that is free from the objectionable characteristics of the previous controls.

Another object is to provide a hydraulic transmission with a control which may be adjusted to cause the motor of the transmission to advance an element continuously to a given point and which may be further adjusted to cause the motor to advance the element farther only during further adjustment of the control.

Other objects and advantages will appear from the description hereinafter given of a control in which the invention is embodied.

According to the invention in its general aspect and as ordinarily embodied in practice, a hydraulic transmission is provided with a control mechanism in which manual operation of a control device transmits motion through a follow-up mechanism to a flow controlling means and moves it in a direction to direct liquid to the motor to cause it to advance an element continuously to a given point at which time motion created by the motor is transmitted through the follow-up mechanism to the flow controlling means and tends to move it in a direction to arrest the flow of liquid to the motor so that thereafter further movement of the control device is necessary to produce further movement of the element.

The invention is exemplified by the control shown in the accompanying drawings in which the views are as follows:

Fig. 2 is a front view taken on a line 2—2 of Fig. 1.

Fig. 3 is a sectional plan view taken on a line 3—3 of Fig. 2.

Figs. 5 and 6 are views showing the reversing valve in positions different from that shown in Fig. 4.

Figure 1:
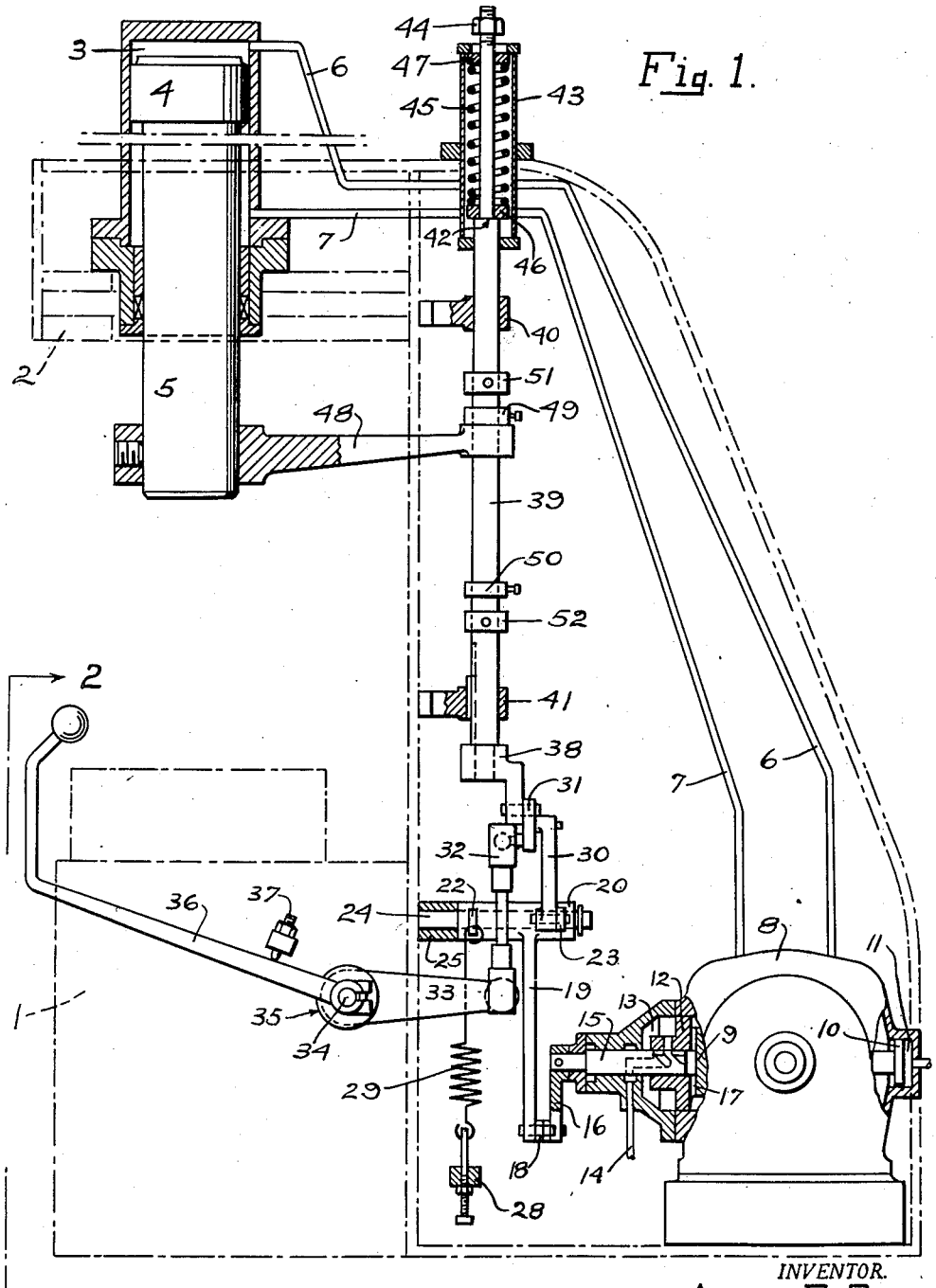
Fig. 1 is a side view showing an embodiment of the invention applied to a straightening press which is powered by a reversible pump.

The invention has been shown applied to a downward acting straightening press for the purpose of illustration but it is to be understood that the invention is not limited to such use and that the terms used herein to denote direction are descriptive and not limiting.

Figs. 1 to 3

The press is provided with a suitable frame having a bed 1 for supporting the work to be straightened and a head 2 for supporting a hydraulic motor consisting of a cylinder 3 which is fixed in head 2 and a piston 4 which is fitted in cylinder 3 and provided with a ram 5 for exerting pressure upon the work.

Cylinder 3 has its opposite ends connected, respectively, by channels 6 and 7 to opposite sides of a reversible pump 8 of the type which will deliver liquid through either channel 6 or channel 7 and at a rate determined by the direction and distance its displacement varying member or slide block 9 is offset from a central or neutral position in which position of slide block 9 the displacement of pump 8 is zero and no liquid will be delivered thereby. Since a pump of this type is shown in Patent No. 2,181,049, only a brief description thereof will be given herein.

As shown, slide block 9 is constantly urged toward the left in respect to Fig. 1 by a piston 10 movable with slide block 9 and fitted in a stationary cylinder 11 to which pressure liquid is continuously supplied. Slide block 9 is adapted to be moved toward the right by a larger piston 12 movable with slide block 9 and fitted in a stationary cylinder 13 to which pressure liquid from a supply channel 14 is supplied under the control of a rotary valve 15 having a control lever 16 connected to the outer end thereof.

Piston 12 and the inner part of valve 15 are fitted together and provided with cooperating ports so arranged that, when valve 15 is rotated in a counterclockwise direction in respect to Fig. 2, liquid from channel 14 will flow through valve 15 to cylinder 13 and move piston 12 and slide block 9 toward the right in respect to Fig. 1 and cause pump 8 to deliver liquid through channel 6 to the upper end of cylinder 2 to move piston 4 downward and, when valve 15 is rotated in the opposite direction, liquid will escape from cylinder 13 through valve 15 and a drain channel 17 and permit the liquid continuously supplied to cylinder 11 to move piston 10 and slide block 9 toward the left and cause pump 8 to deliver liquid through channel 7 to the lower end of cylinder 2 to raise piston 4.

Piston 12 moves with slide block 9 and tends to cut off communication between cylinder 13 and supply channel 14 or drain channel 17 as fast as rotation of valve 15 opens it so that movement of slide block 9 and adjustment of pump displacement ceases substantially as soon as rotation of valve 15 ceases.

The arrangement is such that, when lever 16 is in its neutral position as shown in Fig. 2, pump 8 will be at zero stroke and no liquid will be delivered thereby and, when lever 16 is moved through a given angular distance in one direction or the other, pump 8 will deliver liquid in one direction or the other at a rate proportional to the angular distance lever 16 was rotated from its neutral position.

Lever 16 is connected by a link 18 to the depending arm 19 of a multi-armed lever 20 which also has three horizontal arms 21, 22 and 23 (Fig. 3) and is journaled upon a shaft 24 carried by a stationary bearing 25. Arm 21 is provided at its outer end with a stop bolt 26 which extends through an abutment 27 to limit the angular movement of lever 20. Arm 22 is connected at its outer end to an abutment 28 by a spring 29 which urges lever 20 in a direction to swing lever 16 clockwise. Arm 23 is connected by a link 30 to a floating lever 31 intermediate the ends thereof.

Lever 31 is connected at one of its ends by a suitable ball and socket joint to one end of a link 32 the other end of which is connected by a suitable ball and socket joint to a crank 33 fixed upon one end of shaft 34 which is journaled in a stationary bearing 35 and has a hand lever 36 fixed upon the other end thereof and normally held against a stop 37 by the action of spring 29.

The other end of lever 31 is pivoted to an offset arm 38 carried by a vertical control rod 39 which is reciprocable in two stationary guides 40 and 41 and has its upper end reduced in diameter to provide a shoulder 42. Rod 39 is prevented from rotating in any suitable manner such as by a key carried by one of the guides and fitted in a keyway formed in rod 39.

The upper part of rod 39 extends through a stationary spring chamber 43 and has a nut 44 so adjusted on its upper end that the distance between shoulder 42 and the under side of nut 44 is exactly the same as the distance between the inner faces of the upper and lower walls of chamber 43. A helical spring 45 is arranged around the reduced portion of rod 39 between two spring retainers 46 and 47. Spring 45 tends to hold retainer 46 against shoulder 42 and the bottom of chamber 43 and to hold retainer 47 against nut 44 and the top of chamber 43, to thereby yieldingly support rod 39 in adjusted position but permitting it to be moved a limited distance either upward or downward.

Rod 39 is adapted to be shifted by an arm 48 which is fixed to ram 5 and is slidable upon rod 39 between two collars 49 and 50 fixed thereon in adjusted positions. Collars 49 and 50 limit, respectively, the upward and downward movement of ram 5 and are arranged between two collars 51 and 52 which are permanently fixed to rod 39 so that the press cannot be so adjusted that it would tend to operate beyond its range.

Figure 4:
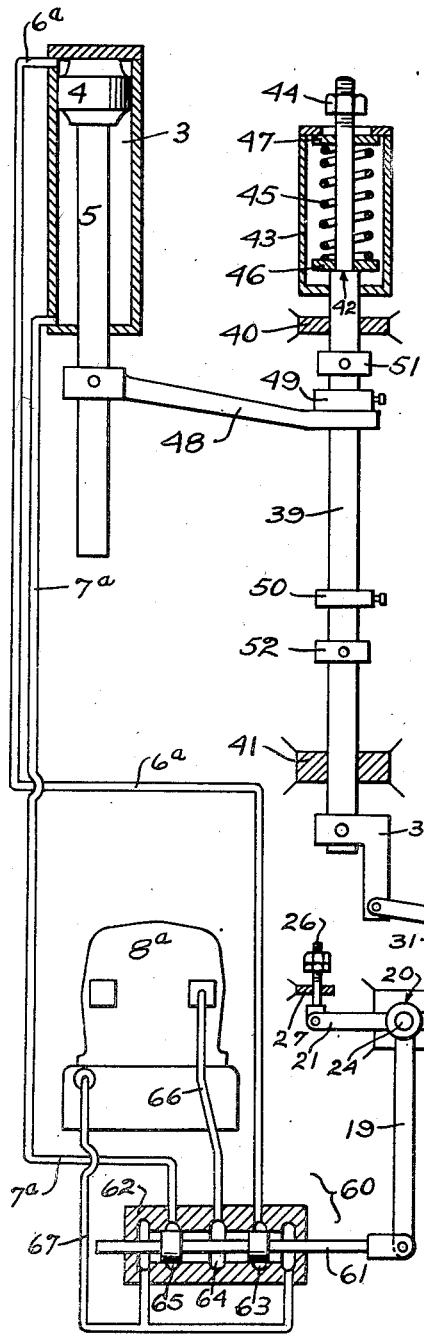
Fig. 4 is a schematic view showing the control in a single plane and applied to a transmission in which the motor is energized by a unidirectional pump and controlled by a reversing valve.

*Fig. 4*

The control has been shown in this figure as being employed to control a transmission the motor 3—4 of which is energized by liquid supplied thereto from a unidirectional pump 8ª under the control of a reversing valve 60, the control being shown schematically with the parts thereof in substantially the same plane in order that the operation of the control may be more readily understood.

Pump 8ª may be of the type that delivers liquid at a predetermined maximum rate until pump pressure reaches a predetermined maximum and then automatically reduces its displacement until it is delivering just sufficient liquid to maintain that maximum pressure constant. Since such pumps are well known and in extensive use, further description thereof will not be given.

As shown, reversing valve 60 has a valve member 61 connected to the depending arm 19 of lever 20 and fitted in a valve body 62 having three annular grooves or ports 63, 64 and 65 formed in the wall of the bore thereof. Ports 63 and 65 are connected, respectively, to the upper and lower ends of cylinder 3 by channels 6ª and 7ª respectively. Port 64 is arranged between ports 63 and 65 and connected by a channel 66 to the outlet of pump 8ª. The bore in valve body 62 has both ends thereof connected by a channel 67 either to the sump of pump 8ª as shown or to the intake thereof according to to the internal construction of the pump.

When valve member 61 is in its central or neutral position as shown in Fig. 4, ports 63 and 65 are blocked so that liquid cannot flow to nor escape from either end of cylinder 3 and piston 4 is supported by the liquid trapped in the lower end of cylinder 3. When valve member 61 is shifted toward the right as shown in Fig. 5, liquid from pump 8ª will flow through channel 66, valve 60 and channel 6ª to the upper end of cylinder 3 and cause piston 4 to move ram 5 downward and to expel liquid from cylinder 3 through channel 7ª, valve 60 and channel 67 to the sump of pump 8ª. When valve member 61 is shifted toward the left as shown in Fig. 6, liquid from pump 8ª will flow through channel 66, valve 60 and channel 7ª to the lower end of cylinder 3 and cause piston 4 to move ram 5 upward and to expel liquid from cylinder 3 through channel 6ª, valve 60 and channel 67 to the sump of pump 8ª.

Operation

Referring more particularly to Fig. 4 and assuming that the parts are in the positions shown in Figs. 1-4, that pump 8 or 8ª is running, that an article arranged upon bed 1 is to be straightened by a tool carried by ram 5 and that collar 50 has been so adjusted upon rod 39 that it will be engaged by arm 48 just before the tool engages the article, the press will operate as follows:

To start ram 5 downward, the operator depresses hand lever 36 to cause crank 33 to raise link 32 and the right end of lever 31. Since rod 39 is stationary, lever 31 will pivot upon arm 38 and cause link 30 to swing lever 20 counterclockwise upon shaft 24 until stop bolt 26 arrests further movement of lever 36 and the follow-up mechanism at which time the depending arm 19 of lever 20 will have moved pump control lever 16 (Fig. 2) or valve member 61 (Fig. 4) far enough to cause the entire output of pump 8 or 8ª to flow to the upper end of cylinder 3 and move piston 4 and ram 5 downward at high speed.

Since arm 48 is fixed to ram 5, it will move downward with it and permit spring 45 to move rod 39 downward until spring retainer 46 engages the bottom of spring chamber 43 and enables spring 45 to hold rod 39 stationary.

Downward movement of rod 39 causes arm 38 to move the left end of lever 31 downward so that, if the operator could move lever 36 to the limit of its movement instantly and then hold it stationary, arm 38 would operate the follow-up mechanism in the opposite direction and cause it to return control lever 16 or valve member 61 to its neutral position to stop the flow of liquid to cylinder 3.

Figure 7:
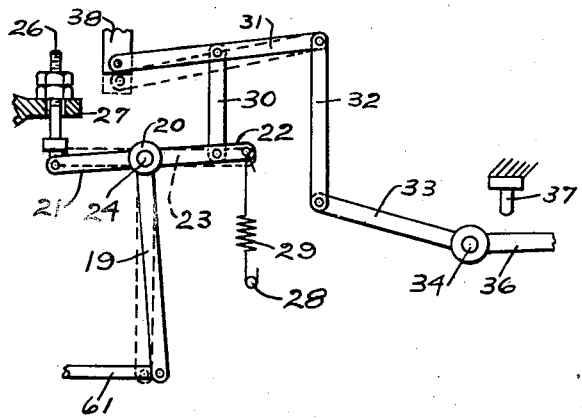
Figs. 7 and 8 are views showing schematically different positions of the follow-up mechanism.

However, ram 5 and rod 39 move downward so rapidly that, by the time the movement of hand lever 36 is arrested by stop bolt 26, downward movement of rod 39 will have ceased and the follow-up mechanism will have been adjusted by the operator to the position indicated in full lines in Fig. 7 so that the pump continues to deliver its full output to cylinder 3 and ram 5 continues downward at high speed until the tool is about to engage the article which is to be straightened and then arm 48 engages collar 50 and moves rod 39 downward to cause arm 38 to move the left end of lever 31 downward.

The operator will then hold hand lever 36 stationary and lever 31 will pivot upon link 32 and cause link 30 to swing lever 20 clockwise until control lever 16 (Fig. 2) or valve member 61 (Fig. 4) is returned to its neutral position to stop the press at which time the parts of the follow-up mechanism are in the positions indicated by dotted lines in Fig. 7.

The operator will then depress lever 36 slightly farther and the follow-up mechanism will move control lever 16 or valve member 61 in the above described manner through a small distance to cause liquid to flow at a limited rate to cylinder 3 and move ram 5 slowly downward. Since arm 48 is in contact with collar 50, rod 39 and arm 38 will move downward with ram 5 and depress the left end of lever 31 and tend to move control lever 16 or valve member 61 to its neutral position so that ram 5 will move through a distance proportional to the distance through which hand lever 36 is being moved and it will stop as soon as lever 36 ceases to move.

After the bent portion of the article has been depressed a desired distance, the operator may raise hand lever 36 slightly and the follow-up mechanism will operate in the above described manner but in the opposite direction to cause liquid to flow to the lower end of cylinder 3 and raise ram 5 a distance proportional to the distance through which lever 36 was raised.

Figure 8:
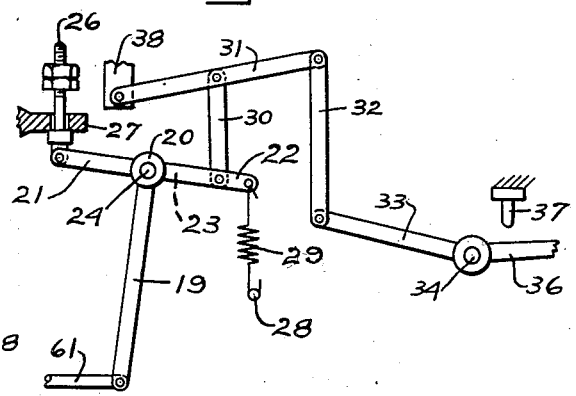

If the bent portion of the article has not been depressed far enough to straighten it, the operator will again depress hand lever 36 and the control will function in the above described manner to cause ram 5 to again exert force upon the article. Ram 5 will be alternately advanced and retracted until the article is straightened and then the operator will release hand lever 36 to permit spring 29 to rotate lever 20 counterclockwise until stopped by stop bolt 26 at which time the parts are in the positions indicated in Fig. 8 and arm 19 of lever 20 will have moved control lever 16 or valve member 61 far enough to cause the entire output of pump 8 or 8ª to flow to the lower end of cylinder 3 and raise piston 4 and ram 5 at high speed.

As soon as ram 5 starts upward, arm 48 will release collar 50 and permit spring 45 to move rod 39 upward to its neutral position and cause arm 38 to raise the left end of lever 31. Since lever 20 is yieldingly held in the position shown by spring 29 and stop bolt 26, raising the left end of lever 31 will cause hand lever 36 to move upward against its stop 37.

Ram 5 will continue upward at high speed until arm 48 engages collar 49 and moves rod 39 upward against the resistance of spring 45 and causes arm 38 to raise the left end of lever 31. Since link 32 is held stationary by lever 36 engaging stop 37, lever 31 will pivot thereon and cause link 30 to swing lever 20 counterclockwise until the arm 19 thereof has moved control lever 16 or valve member 61 to its neutral position to stop the press with the parts in the positions shown in Figs. 1 to 4.

The invention thus provides absolute and accurate control of the ram during the straightening operation and provides high speed movement of the ram toward and from the work.

The control disclosed herein is susceptible of various modifications and adaptations without departing from the scope of the invention which is hereby claimed as follows.

I claim:

1. The combination, with a hydraulic motor adapted to advance and retract an element and having two ports for the admission and discharge of liquid, a pump, and means for directing liquid from said pump to said motor to energize the same including flow control means normally occupying a neutral position in which no liquid is delivered to said motor and adjustable in one direction or the other from said neutral position to direct liquid to one or the other of said ports and thereby cause said motor to move said element in one direction or the other, of means for adjusting said flow control means in one direction or the other, manual means adapted to operate said adjusting means to effect movement of said flow control means in a direction to cause said motor to advance said element, means for stopping said manual means in a given position, and means responsive to said element advancing to a given point for causing said adjusting means to return said flow control means to its neutral position to stop said motor, the last mentioned means also rendering said stopping means ineffective so that said manual means may be moved beyond said position to effect further advance of said element.

2. In a hydraulic press having a ram, a reciprocating motor for advancing and retracting said ram and a pump, the combination of means for directing liquid from said pump to said motor to energize the same and including flow control means normally occupying a neutral position in which no liquid is delivered to said motor and adjustable in one direction or the other from said neutral position to direct liquid to one end or the other of said motor and thereby cause said motor to advance or retract said ram, manually operable means for adjusting said flow control means in a direction to cause said motor to advance said ram, means operable by said ram only after it has advanced through a given distance for returning said flow control means to neutral position to stop said motor and thereby necessitate further operation of said manual means to effect further advance of said ram, yieldable means effective upon release of said manual means for adjusting said flow control means in the opposite direction to thereby cause said motor to retract said ram, and means operable by said ram at a given point in its retraction stroke for adjusting said control means to neutral position to thereby stop said motor.

3. A control, for a hydraulic transmission having a motor for moving an element, a pump for supplying liquid to said motor to energize it and means for controlling the flow of liquid to said motor, comprising a follow-up mechanism connected to said flow control means, manual means for transmitting motion through said follow-up mechanism to said flow control means to move it far enough to cause said motor to advance said element at high speed, means for limiting said motion, and means responsive to said element reaching a given point for causing said follow-up mechanism to move said flow control means in the opposite direction until said motor is stopped and to simultaneously render said limiting means ineffective and thereby enable said manual means to be further adjusted to effect a further advance of said element proportional to said further adjustment of said manual means.

4. The combination, with a cylinder, a piston fitted in said cylinder and provided with a rod, a pump, means for directing liquid from said pump to opposite ends of said cylinder selectively including flow control means normally occupying a neutral position in which no liquid is delivered to said cylinder and movable in one direction or the other from said neutral position to direct liquid to one end or the other of said cylinder, of a follow-up mechanism having one part thereof connected to said flow control means, a member yieldingly retained in a stationary position and connected to a second part of said follow-up mechanism, a control element connected to a third part of said follow-up mechanism and adapted to transmit motion through said follow-up mechanism to said flow control means and move it in a direction to cause liquid to flow to one end of said cylinder and advance said piston and rod, and means operated by said rod at a given point in its advance for moving said member in a direction to cause said follow-up mechanism to move said flow control means to its neutral position to stop said piston rod whereby further advance of said piston rod may be effected only in response to further operation of said control element.

5. The combination, with a cylinder, a piston fitted in said cylinder and provided with a rod, a pump, means for directing liquid from said pump to opposite ends of said cylinder selectively including flow control means normally occupying a neutral position in which no liquid is delivered to said cylinder and movable in one direction or the other from said neutral position to direct liquid to one end or the other of said cylinder, of a follow-up mechanism having one part thereof connected to said flow control means, a member yieldingly retained in a stationary position and connected to a second part of said follow-up mechanism, a control element connected to a third part of said follow-up mechanism and adapted to transmit motion through said follow-up mechanism to said flow control means and move it far enough in a direction to cause liquid to flow to one end of said cylinder and advance said piston and its rod at high speed, means for limiting said motion, and means operated by said rod at a given point in its advance for moving said member in a direction to cause said follow-up mechanism to move said flow control means to its neutral position to stop said piston rod and to simultaneously render said limiting means ineffective to thereby enable said control element to be further adjusted to effect a further advance of said rod proportional to said further adjustment of said control element.

6. The combination, with a cylinder, a piston fitted in said cylinder and provided with a rod, a reversible pump, fluid channels connecting opposite ends of said cylinder to opposite sides of said pump, pump regulating means normally occupying a neutral position in which no liquid is delivered to said cylinder and movable in one direction or the other from said neutral position to direct liquid to one end or the other of said cylinder, of a follow-up mechanism having one part thereof connected to said pump regulating means, a member yieldingly retained in a stationary position and connected to a second part of said follow-up mechanism, a control element connected to a third part of said follow-up mechanism and adapted to transmit motion through said follow-up mechanism to said pump regulating means and move it far enough in a direction to cause liquid to flow to one end of said cylinder and advance said piston and its rod at high speed, means for limiting said motion, and means operated by said rod at a given point in its advance for moving said member in a direction to cause said follow-up mechanism to move said pump regulating means to its neutral position to stop said piston rod and to simultaneously render said limiting means ineffective and thereby enable said control element to be further adjusted to effect a further advance of said rod proportional to said further adjustment of said control element.

7. The combination, with a cylinder, a piston fitted in said cylinder and provided with a rod, a pump, means for directing liquid from said pump to opposite ends of said cylinder selectively including flow control means normally occupying a neutral position in which no liquid is delivered to said cylinder and movable in one direction or the other from said neutral position to direct liquid to one end or the other of said cylinder, of a follow-up mechanism having one part thereof connected to said flow control means, a control rod connected to a second part of said follow-up mechanism, means adapted to yieldingly hold said control rod in a stationary position, a collar fixed in adjusted position upon said control rod, a control element connected to a third part of said follow-up mechanism and adapted to transmit motion through said follow-up mechanism to said flow control means and move it far enough in a direction to cause liquid to flow to one end of said cylinder and advance said piston and its rod at high speed, and an arm fixed to said piston rod and slidable upon said control rod to engage said collar at a given point in the advance of said piston rod and move said control rod in a direction to cause said follow-up mechanism to move said flow control means to its neutral position to stop said piston rod whereby further advances of said piston rod may be effected only in response to further operation of said control element.

8. The combination, with a cylinder, a piston fitted in said cylinder and provided with a rod, a reversible pump, fluid channels connecting opposite ends of said cylinder to opposite sides of said pump, pump regulating means normally occupying a neutral position in which no liquid is delivered to said cylinder and movable in one direction or the other from said neutral position to direct liquid to one end or the other of said cylinder, of a follow-up mechanism having one part thereof connected to said pump regulating means, a control rod connected to a second part of said follow-up mechanism, means adapted to yieldingly hold said control rod in a stationary position, a collar fixed in adjusted position upon said control rod, a control element connected to a third part of said follow-up mechanism and adapted to transmit motion through said follow-up mechanism to said pump regulating means and move it far enough in a direction to cause liquid to flow to one end of said cylinder and advance said piston and its rod at high speed, means for limiting said motion, and an arm fixed to said piston rod and slidable upon said control rod to engage said collar at a given point in the advance of said piston rod and move said control rod in a direction to cause said follow-up mechanism to move said flow control means to its neutral position to stop said piston rod and to simultaneously render said motion limiting means ineffective and thereby enable said control element to be further adjusted to effect a further advance of said piston rod proportional to said further adjustment of said control element.

9. The combination, with a cylinder, a piston fitted in said cylinder and provided with a rod, a pump, means for directing liquid from said pump to opposite ends of said cylinder selectively including flow control means normally occupying a neutral position in which no liquid is delivered to said cylinder and movable in one direction or the other from said neutral position to direct liquid to one end or the other of said cylinder, of a follow-up mechanism having one part thereof connected to said flow control means, a control rod connected to a second part of said follow-up mechanism, means adapted to yieldingly hold said control rod in a stationary position, a collar fixed in adjusted position upon said control rod, a control element connected to a third part of said follow-up mechanism and adapted to transmit motion through said follow-up mechanism to said flow control means and move it far enough in a direction to cause liquid to flow to one end of said cylinder and advance said piston and its rod at high speed, an arm fixed to said piston rod and slidable upon said control rod to engage said collar at a given point in the advance of said piston rod and move said control rod in a direction to cause said follow-up mechanism to move said flow control means to its neutral position to stop said piston rod whereby further advance of said piston rod may be effected only in response to further operation of said control element, a stop, a spring for moving said control element against said stop and for moving said flow control means in a direction to cause said motor to retract said piston rod, and a second collar fixed upon said control rod in such a position that said arm engages it near the end of the return stroke of said piston and moves said control rod in a direction to cause said follow-up mechanism to return said control mechanism to its neutral position.

ADOLF R. GRAD.